(12) United States Patent
Kadam et al.

(10) Patent No.: US 11,892,894 B2
(45) Date of Patent: *Feb. 6, 2024

(54) DYNAMIC POWER SHARING DUAL USB TYPE C AND POWER DELIVERY RECEPTACLE

(71) Applicant: EATON INTELLIGENT POWER LIMITED, Dublin (IE)

(72) Inventors: Nilesh Ankush Kadam, Pune (IN); Saivaraprasad Murahari, Peachtree City, GA (US); Stanislav Popelka, Zatec (CZ)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,850

(22) Filed: Jan. 13, 2023

(65) Prior Publication Data
US 2023/0152877 A1 May 18, 2023

Related U.S. Application Data

(63) Continuation of application No. 17/488,851, filed on Sep. 29, 2021, now Pat. No. 11,586,271.

(51) Int. Cl.
*G06F 1/3234* (2019.01)
*G06F 13/38* (2006.01)
*G06F 1/26* (2006.01)

(52) U.S. Cl.
CPC .............. *G06F 1/3253* (2013.01); *G06F 1/26* (2013.01); *G06F 13/382* (2013.01); *G06F 2213/0042* (2013.01)

(58) Field of Classification Search
CPC ........ G06F 1/3253; G06F 1/26; G06F 13/382; G06F 2213/0042
See application file for complete search history.

(56) References Cited

U.S. PATENT DOCUMENTS

| | | | |
|---|---|---|---|
| 8,237,414 B1 * | 8/2012 | Li | H02J 7/00047 320/160 |
| 9,858,796 B2 * | 1/2018 | Ricciuti | H01R 13/665 |
| 10,483,679 B1 * | 11/2019 | Kadam | H01R 13/6683 |
| 10,615,632 B2 * | 4/2020 | Kadam | H02J 7/02 |
| 10,770,843 B1 * | 9/2020 | Zhang | G06F 1/26 |

(Continued)

*Primary Examiner* — Brian T Misiura
(74) *Attorney, Agent, or Firm* — Eckert Seamans Cherin & Mellott, LLC

(57) ABSTRACT

A receptacle includes a plurality of universal serial bus (USB) ports including a USB Type C PD port and a USB Type C port couplable to respective devices for charging, a controller coupled to the USB ports and including a dynamic power sharing logic, the controller structured to: determine whether one or more USB ports are coupled to the respective devices and manage first power negotiation and dynamic power sharing if both USB ports are coupled to respective devices or manage second power negotiation if only one USB port is coupled to respective device; an AC/DC converter including a gallium nitride (GaN) MOSFET on at least one of the primary side or the secondary side of the AC/DC converter, the AC/DC converter structured to provide high power to the USB Type C PD port; and a DC/DC converter structured to provide low power to the USB Type C port.

12 Claims, 5 Drawing Sheets

(56) References Cited

U.S. PATENT DOCUMENTS

| | | | | |
|---|---|---|---|---|
| 10,923,941 | B2* | 2/2021 | Jahan | H02J 7/0019 |
| 10,978,896 | B2* | 4/2021 | Sultenfuss | G06F 1/266 |
| 11,061,457 | B1* | 7/2021 | Bhattacharjee | G06F 1/3215 |
| 11,093,020 | B2* | 8/2021 | Kadgi | G06F 13/4282 |
| 11,132,040 | B2* | 9/2021 | Steele | G01R 21/133 |
| 11,398,741 | B2* | 7/2022 | Li | H02J 7/0047 |
| 11,460,907 | B2* | 10/2022 | Kadam | G06F 1/3243 |
| 11,586,271 | B1* | 2/2023 | Kadam | G06F 1/3253 |
| 2008/0012423 | A1* | 1/2008 | Mimran | H01R 25/003 |
| | | | | 307/11 |
| 2009/0251127 | A1* | 10/2009 | Kim | H02J 13/00002 |
| | | | | 324/76.11 |
| 2012/0292991 | A1* | 11/2012 | Dodal | H02H 3/16 |
| | | | | 307/11 |
| 2014/0208134 | A1* | 7/2014 | Waters | G06F 13/4282 |
| | | | | 713/310 |
| 2016/0006283 | A1* | 1/2016 | Liu | H02J 7/0014 |
| | | | | 320/112 |
| 2017/0187155 | A1* | 6/2017 | Jansen | H05K 5/0286 |
| 2017/0193793 | A1* | 7/2017 | Ricciuti | G08B 25/08 |
| 2018/0287491 | A1* | 10/2018 | Muto | G06F 1/3206 |
| 2018/0375358 | A1* | 12/2018 | Sultenfuss | H02J 7/0068 |
| 2020/0012326 | A1* | 1/2020 | Steele | G01R 21/133 |
| 2020/0091758 | A1* | 3/2020 | Jahan | H02J 7/02 |
| 2020/0295581 | A1* | 9/2020 | Li | H02J 7/0013 |
| 2020/0303939 | A1* | 9/2020 | Perry | H02J 7/007186 |
| 2021/0083500 | A1* | 3/2021 | Quek | H02J 7/0024 |
| 2021/0103326 | A1* | 4/2021 | Kadam | G06F 1/3243 |
| 2021/0257845 | A1* | 8/2021 | Cooney | H02J 7/0013 |
| 2021/0351716 | A1* | 11/2021 | Richards | H02M 3/158 |
| 2023/0152877 | A1* | 5/2023 | Kadam | G06F 1/3253 |
| | | | | 713/320 |

* cited by examiner

POWER PROFILE-USB PD PORT-5V@3A
9V@3A, 15V@3A AND 20V@3A

USB TYPE C PD PORT

POWER PROFILE-USB PD PORT-5V@3A, 9V@3A, 15V@3A AND 20V@3A
USB TYPE C PORT-5V@3A

USB TYPE C PD PORT

USB TYPE C PORT

DYNAMIC POWER SHARING DUAL USB TYPE C AND POWER DELIVERY RECEPTACLE

CROSS REFERENCE TO RELATED APPLICATION

This application claims the benefit of U.S. patent application Ser. No. 17/488,851, filed Sep. 29, 2021, which is incorporated by reference herein.

BACKGROUND

Field

The disclosed concept relates generally to receptacles, and in particular, to dynamic power sharing dual USB Type C & Power Delivery (PD) receptacles.

Background Information

Electricity is often provided to electric devices via an electrical receptacle in the wall or floor of a room. Electrical receptacles are usually duplex-type electrical receptacles that include two sockets coupled together with a common housing. Each socket is able to electrically connect to and provide power to one power cord.

Some types of receptacles have replaced one of their sockets with one or more universal serial bus (USB) ports. The receptacle will include circuitry to convert utility power to that which is usable by the USB ports. The receptacle also needs to include a controller to control operation of the USB ports. The USB ports can be used to charge a variety of electronic devices such as phones and tablets.

The USB power delivery (PD) technology has helped significantly to charge the electronic devices very fast due to increased power capacity required by the USB PD standards. For example, more current USB standards provide increased power capacity requirements for USB ports, including 100 Watts (e.g., 20V@5 A), whereas under the USB Charging Specification 3.0 the maximum power that can be provided is 4.5 Watts (e.g., 0.9 A@5V). The USB PD supports a single adapter for numerous devices through a feature that negotiates with an attached device to learn the device's charging voltage. The normative voltages in USB PD include 5V, 9V, 15V and 20V. This negotiating feature enables the adapter to adjust the voltage and power delivery for on-the-fly compatibility with everything from small devices that need mill watts (mW) of power to large laptops that need higher power. For example, a cellphone needs 5V, whereas a laptop needs 20V. However, the adoption of the new PD standards in USB Wall receptacles poses challenges in having to fit the increased power capacity in the standard USB Wall receptacle form factor.

There is room for improvement in USB power sharing.

SUMMARY

These needs and others are met by embodiments of the disclosed concept in which a dynamic power sharing dual USB Type C & power delivery (PD) receptacle is provided.

In accordance with one aspect of the disclosed concept, a receptacle includes: a plurality of universal serial bus (USB) ports comprising a USB Type C power delivery (PD) port and USB Type C port, the USB ports couplable to respective devices for charging; a controller coupled to the USB Type C PD port and the USB Type C port, the controller comprising a dynamic power sharing logic and structured to (i) determine whether one or more USB ports are coupled to the respective devices, and (ii) manage a first power negotiation and dynamic power sharing between the USB Type C PD port and the USB Type C port based on a determination that both the USB Type C PD port and the USB Type C port are coupled to the respective devices, or manage a second power negotiation between one USB port and the respective device based on a determination that only the one USB port is coupled to the respective device; an alternating current to direct current (AC/DC) converter including a gallium nitride (GaN) MOSFET on at least one of the primary side or the secondary side of the AC/DC converter, the AC/DC converter coupled to the controller and structured to provide high power to the USB Type C PD port; and a DC/DC converter coupled to the controller and the AC/DC converter and structured to receive DC from the AC/DC converter and provide low power to the USB Type C port.

In accordance with another aspect of the disclosed concept, a method of dynamic power sharing using a dual universal serial bus (USB) Type C receptacle includes initializing power for the dual USB Type C receptacle comprising a plurality of USB ports including a USB Type C power delivery (PD) port and a USB Type C port, the USB ports being couplable to respective devices for charging; determining whether one or more USB ports are coupled to the respective devices for charging; and managing a first power negotiation and dynamic power sharing between the USB Type C PD port and the USB Type C port based on a determination that both the USB Type C PD port and the USB Type C port are coupled to the respective devices for charging, or managing a second power negotiation between one USB port and the respective device for charging based on a determination that only the one USB port is coupled to the respective device.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
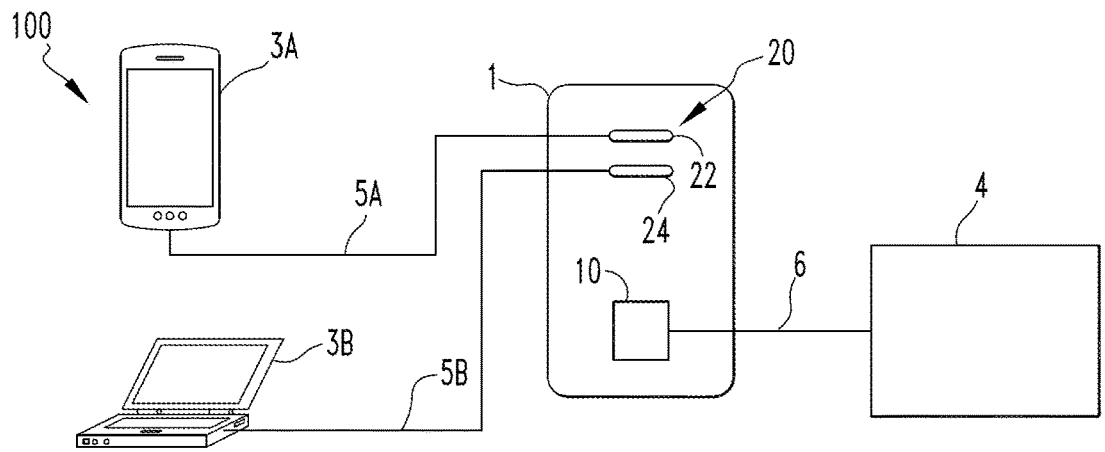
FIG. 1 is a diagram of a USB PD system in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

The USB power delivery (PD) technology has helped significantly to charge the electronic devices extremely fast due to increased power capacity required by the USB PD standards. For example, more current USB standards provide increased power capacity requirements including, e.g., 100 W (e.g., 20V@5 A), whereas under the USB Charging Specification 3.0 the maximum power that can be provided is 4.5 Watts (e.g., 0.9 A@5V). The USB PD supports a single adapter for numerous devices through a feature that negotiates with attached device(s) to learn the device's charging voltage. The normative voltages in USB PD include 5V, 9V, 15V and 20V. The negotiating feature enables the adapter to adjust the voltage and power delivery for on-the-fly compatibility with everything from small devices that need mill watts (mW) of power to large devices that need higher power (e.g., without limitation 100 W). For example, a cellular phone needs 5V, whereas a laptop needs 20V. If a cellular phone is coupled to a USB port of the USB wall receptacle, then upon power initialization, the USB port and the cellular phone undergo power negotiation. During the power negotiation, the USB port advertises its power profile and the cellular phone acknowledges the advertisement. In response, the cellular phone transmits its power requirement to the USB port. The USB port then acknowledges receipt of the power requirement and transmits a reply (e.g., PS_ready) indicating that it is capable of providing the required power to the cellular phone. The cellular phone then activates $V_{Bus}$ and receives the power from the USB port for charging.

However, the adoption of the new USB standards poses challenges in having to fit the increased power capacity required under the new standards in the conventional USB Wall receptacle form factor, which is governed by the NEMA standard. For example, high efficiency, high density power supply solutions satisfying the increased power capacity requirement under the standards are needed. Such solutions enable multiple power supply stages, which is adding the hardware components as well as overall cost of the system. That is, in order to meet the increased power capacity requirement, additional hardware (e.g., a higher power supply circuit) may need be added within the USB Wall receptacle, requiring a design change, and thus increasing manufacturing costs. In order to overcome this challenge, the dynamic power sharing dual USB Type C receptacle in accordance with the present disclosure utilizes two power stages using a dynamic power sharing logic, allowing the USB ports to simultaneously and dynamically share power in a fast and efficient manner without compromising power capacity and power density.

The two power stages include the first power stage, which is the AC/DC power-conversion stage using a conventional AC/DC converter, and the second power stage, which is the DC/DC power-conversion stage using a conventional DC/DC converter. The AC/DC converter may be, e.g., without limitation, flyback topology, and provides power directly to a USB Type C PD port. As the DC power is not reduced or stepped down, the AC/DC converter is capable of providing high power (e.g., without limitation, 45 W) to the USB Type C PD port for charging a device (e.g., without limitation, a laptop) requiring the high power via a MOSFET. The second power stage uses a high-efficiency DC/DC converter with, e.g., without limitation, a buck converter, a buck boost converter, etc. The DC/DC converter is coupled to the AC/DC converter and structured to step down the DC voltage received from the AC/DC converter to a low voltage sufficient to power a device (e.g., without limitation, a cellular phone) requiring low power (e.g., without limitation, up to 15 W) for charging via another MOSFET.

The novel two power stages allow the USB ports to simultaneously charge devices at different power capacities using different voltage ratings unlike the conventional USB receptacles that must pull down the voltage rating of the USB Type C PD port to the same constant 5V which the USB Type C port supplies to its attached device. Since the USB Type C PD port's voltage rating need not be reduced to the constant 5V, the USB Type C PD port of the dynamic power sharing dual USB Type C & PD receptacle is still capable of charging the attached device at high power capacity. As such, the USB ports may negotiate and share power in accordance with the dynamic power sharing. For example, assume that the dynamic power sharing dual USB Type C & PD receptacle has a total power capacity at 60 W, the USB Type C port is coupled to a cellular phone and the USB Type C PD port is coupled to a laptop. The USB Type C port has maximum power capacity of 15 W and has a constant 5V rating with an adjustable current. If the USB Type C port advertises a power profile including a 15 W power rating and a voltage and current rating of 5V@3 A, then the USB Type C PD port under the dynamic power sharing logic may still advertise a power profile including a power rating representing the remaining power capacity and its variable voltage and current ratings. In this example, the power rating of the USB Type C PD port advertises would be 45 W (total power capacity (60 W)—USB Type C port advertised power capacity (15 W)), and the voltage and current ratings may include 5V@3 A, 9V@3 A, 15V@3 A and 20V@3 A. Upon acceptance by the attached devices and receipt of a PS_ready message, the USB Type C PD port may provide 45 W at 15V to the laptop while the USB Type C port supplies 15 W at 5V to the cellular phone. As such, by allowing the USB ports to charge devices at different power ratings with different voltage ratings, the two power stages and the dynamic power sharing logic maximize the full power capacity of the receptacle without having to waste power capacity or comprising power density and charging time, thereby increasing the efficiency and optimizing the power density.

In some embodiments, one or more MOSFETs may be gallium nitride (GaN) MOSFETs. For example, a GaN MOSFET is used in the AC/DC power-conversion stage for the primary side to improve the efficiency and power density. In some examples, a GaN MOSFET may also be used in the secondary side of the AC/DC power converter to further improve the efficiency. A GaN MOSFET is smaller and faster than a conventional silicon MOSFET. For example, a GaN MOSFET has four times faster turn-on times than a silicon MOSFET. Further, a GaN MOSFET operates at higher voltages and lower leakage currents than a silicon MOSFET, resulting in higher power density. Additionally, a GaN MOSFET has higher electron mobility than the silicon or silicon carbide MOSFET, suitable for high frequencies. Thus, a GaN MOSFET can be easily fit within a USB Wall socket due to its small size and significantly improves efficiency by fast charging with high power density.

FIG. 1 is a schematic diagram of a USB charging system 100 in accordance with an example embodiment of the disclosed concept. The USB charging system 100 may include a dynamic power sharing dual USB Type C& PD receptacle 1, devices 3A,3B coupled to the dynamic power sharing dual USB Type C receptacle 1 for charging, and a power source 4. The dynamic power sharing dual USB Type C receptacle 1 may charge the devices 3A,3B with power received from the power source 4 via the USB charging cables 5A,5B. The dynamic power sharing dual USB Type C receptacle 1 may include a socket 10 and a USB connection area 20 including USB Type C PD port 22 and USB Type C port 24 (hereinafter, collectively referred to as USB ports). The socket 10 may be coupled to the power source 4 via a power cable 6 or wirelessly, and may be structured and configured to receive utility power (e.g., 120 Vac) from the power source 4. A USB Type C PD port 22 is a power delivery (PD) port capable of delivering higher power (e.g., more than 15 W). A USB type C port 24 outputs power up to 15 W, and thus, is structured to deliver low power to devices (e.g., without limitation, a cellular phone 3A) requiring low charging power (e.g., up to 15 W). The USB ports 22,24 may be coupled to the power source 4 via the power cable 6 or wirelessly and structured to receive power from the power source 4. The USB ports 22,24 are couplable to the devices 3A,3B and structured to charge these devices 3A,3B via USB charging cables 5A,5B. The USB ports 22,24 are structured and configured to receive USB Type C connectors. In some examples, the dynamic power sharing dual USB Type C receptacle 1 may include a display (not shown) to display real-time power information, including a voltage and current rating and power rating for each USB port. The devices 3A,3B may be any devices or systems chargeable by the USB PD ports 22,24, e.g., a handheld device, a tablet, a netbook, a laptop, a notebook, a hub, a dock, a workstation, etc. The power source 4 may be a power station, a power plant, etc.

Figure 2:
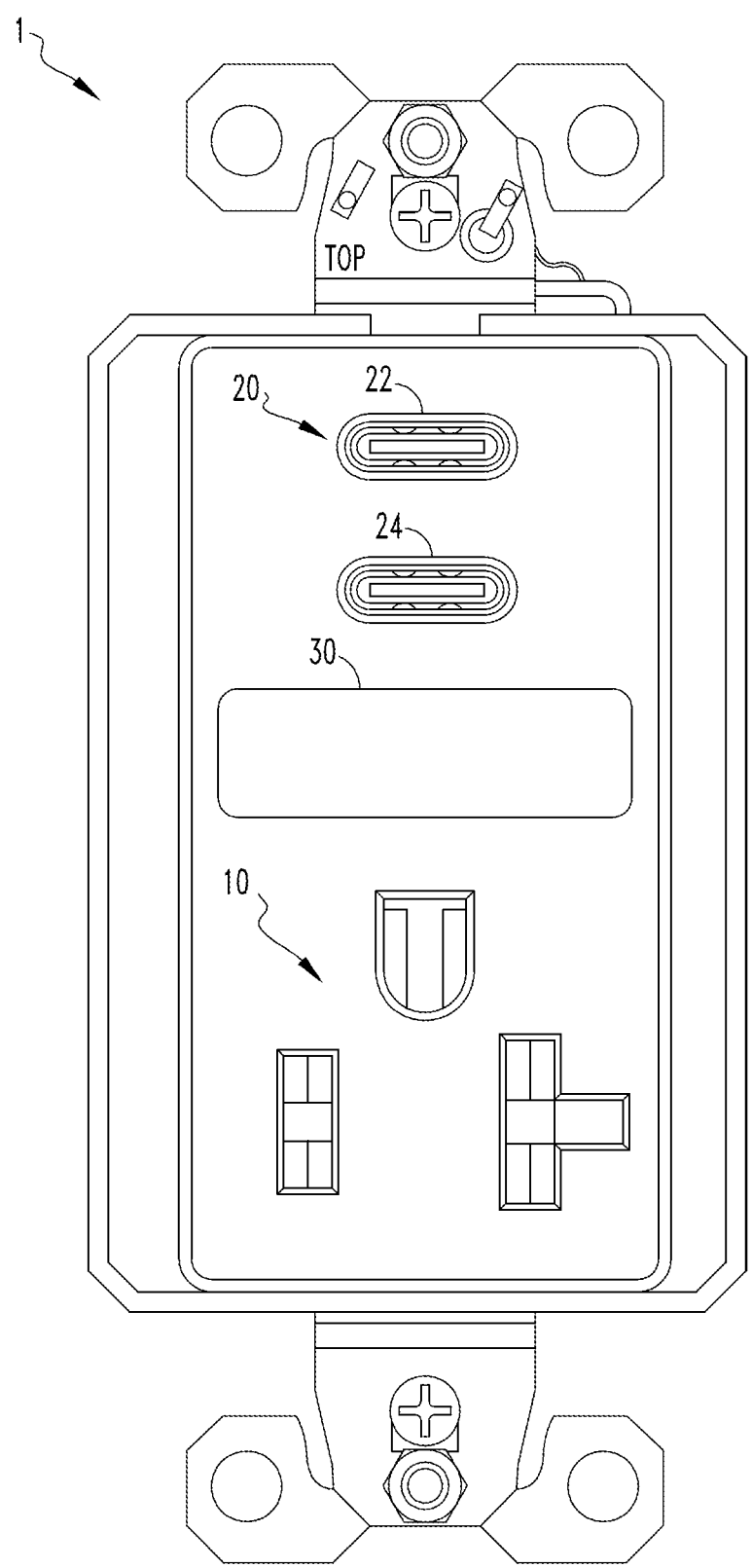
FIG. 2 is a front view of an example receptacle in accordance with an example embodiment of the disclosed concept.

FIG. 2 is a front view of an example dynamic power sharing dual USB Type C & PD receptacle 1 in accordance with an example embodiment of the disclosed concept. The dynamic power sharing dual USB Type C receptacle 1 includes a traditional socket 10, a USB connection area 20 including USB Type C PD port 22 and USB Type C port 24. The socket 10 and/or the USB connection area 20 may be coupled to a power supply, e.g., a flyback circuit (discussed in detail with reference to FIG. 4), which may convert AC utility power to DC power for use by the socket 10 and/or the USB ports 22,24. The USB ports 22,24 are discussed further in detail with reference to FIGS. 4 and 5. While FIG. 2 shows a USB Wall receptacle with single socket 10, this is for illustrative purposes only and the receptacle may include more than one socket, e.g., a duplex socket.

Figure 3A:
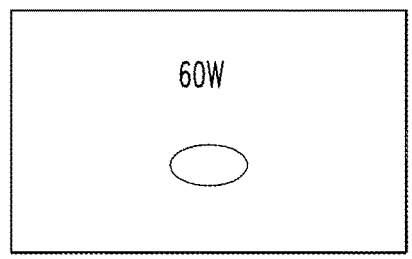
FIGS. 3A-B illustrate power profiles of USB ports being advertised in accordance with example embodiments of the disclosed concept.
Figure 3B:
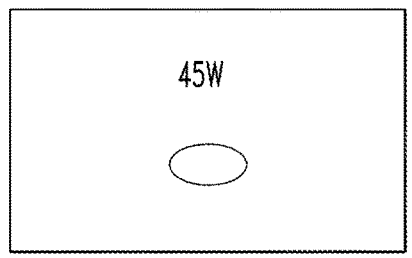
Figure 3B:
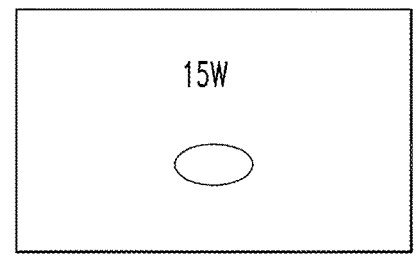

FIGS. 3A-B illustrate example power profiles of USB ports 22,24 being advertised in accordance with example embodiments of the disclosed concept. FIG. 3A shows a power profile of a USB Type C PD port 22 of a dynamic power sharing dual USB Type C & PD receptacle 1 when only the USB Type C PD port 22 is active and connected to a device for charging. The power profile includes power rating up to 60 W and voltage and current ratings including 5V@3 A, 9V@3 A, 15V@3 A and 20V@3 A. FIG. 3B shows power profiles of the USB ports 22,24 when both USB Type C PD port 22 and USB Type C port 24 are active and connected to respective devices for charging using dynamic power sharing. The profiles show the power profile of the USB Type C PD port 22 with the power rating up to 45 W (i.e., total power capacity (60 W)—the advertised power of the USB Type C port 22 (15 W)), and the power profile of the USB Type C port 24 with the power rating up to 15 W and a voltage/current rating including 5V@3 A.

Figure 4:
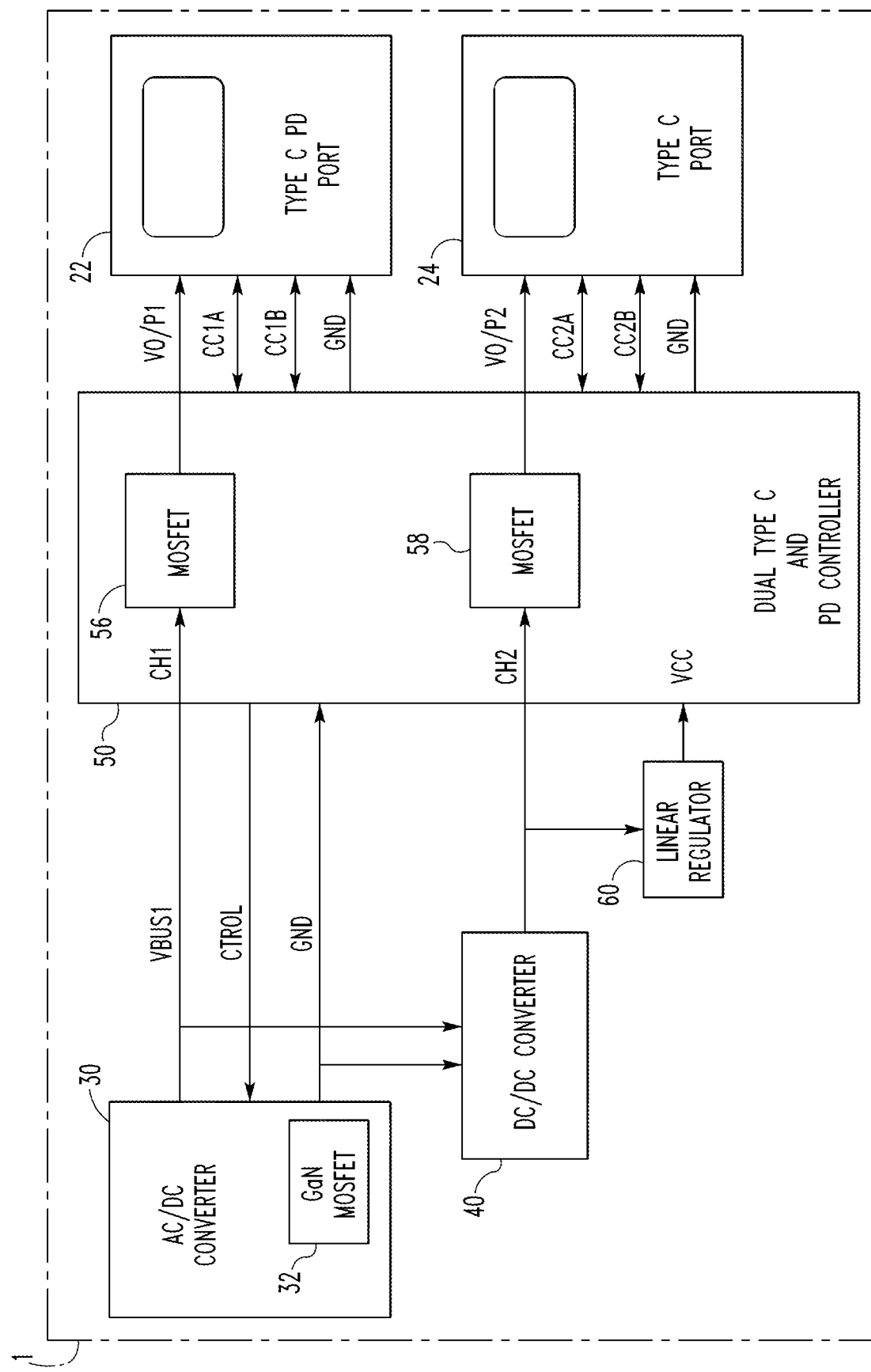
FIG. 4 is a schematic diagram of circuitry of a receptacle in accordance with an example embodiment of the disclosed concept.

FIG. 4 is a schematic diagram of circuitry of the dynamic power sharing dual USB Type C receptacle 1 in accordance with an example embodiment of the disclosed concept. The circuitry includes an AC/DC converter 30, a DC/DC converter 40, a dual Type C PD controller 50 including a dynamic power sharing logic, a linear regulator 60, and a USB Type C PD port 22 and a USB Type C port 24 (hereinafter, collectively referred to as USB ports 22,24). The USB ports 22,24 may receive power for, e.g., charging respective devices (e.g., the devices 3A,3B as described with reference to FIG. 1) connected to the USB ports 22, 24 via USB charging cables 5A,5B. The USB ports 22, 24 may be smart USB ports in that the USB ports 22, 24 each may allow devices 3A,3B to specify the amount of power the devices 3A,3B need for charging during power negotiation and disconnect the current once the devices 3A,3B are fully charged. The USB ports 22,24 are structured and configured to receive USB Type C connectors, and advertise power profile(s) depending on whether one or both USB ports are active.

The USB Type C PD port 22 is structured to receive power from the AC/DC converter 30 and is couplable to a first device 3A,3B for charging. When connected, the USB Type C PD port 22 supplies power to the first device 3A,3B. Generally, the USB Type C PD port 22 supplies high power to devices requiring more than 15 W for charging, but may supply power to any devices requiring different levels of power profiles for charging (e.g., up to 15 W, 100 W, 240 W, etc.). The USB Type C port 24 is couplable to a second device 3A for charging and structured to receive power from a DC/DC converter 40 and supply low power up to 15 W to the second device 3A, when connected.

The AC/DC converter 30 is coupled to the dual Type C & PD controller 50 (specifically, a MOSFET 56 included in the dual Type C PD controller 50), and structured to receive utility power from an AC power source 4 and convert AC to DC power for use by the USB ports 22,24. When both USB ports 22,24 are connected for simultaneous charging of respective devices 3A,3B, the AC/DC converter 30 acts as a first power stage and provide DC power to the USB Type C PD port 22 at a first power rating. The first power rating includes high power (i.e., greater than 15 W) to the USB Type C PD port 22 via the MOSFET 56 for charging the first device requiring charging power greater than 15 W. The AC/DC converter 30 may be, e.g., flyback topology and is coupled to the MOSFET 56, which in turn is coupled to a USB Type C PD port 22. Further, the AC/DC converter 30 also includes a GaN MOSFET 32 for the primary side to improve the efficiency and power density. In some examples, a GaN MOSFET 32 may also be used in the secondary side of the AC/DC power converter to further improve the efficiency. As such, the GaN MOSFET 32 with secondary-side synchronous rectification helps to improve the power density as well as optimize the overall design. As the DC power is not reduced or stepped down, the AC/DC converter 30 is capable of providing high power to charge the first device (e.g., a laptop) requiring high charging power (e.g., greater than 15 W). The MOSFET 56 may be any MOSFET (e.g., a silicon MOSFET, etc.), however, to improve efficiency, it may be a GaN MOSFET.

The DC/DC converter 40 is coupled to the AC/DC converter 30 and the dual Type C & PD controller 50 (specifically, a MOSFET 58 within the controller 50). The DC/DC converter 40 is structured to receive the DC power from the AC/DC converter 30, reduce or step down the DC voltage to a low voltage, e.g., 5V, and provide low power to the USB Type C port 24 at a second power rating (e.g., up to 15 W). The DC/DC converter 40 may be, e.g., without limitation, a buck converter, a buck boost converter, etc. and coupled to a linear regulator 60. The linear regulator 60 keeps the reduced voltage constant (e.g., at 5V). The MOSFET 58 is coupled to the USB Type C port 24 and structured to turn on the USB Type C port 24 to supply power to the second device 3A requiring low power (e.g., up to 15 W) for charging. The MOSFET 58 may be any MOSFET (e.g., a silicon MOSFET, GaN MOSFET, etc.). When both USB ports 22,24 are connected to the first and second devices 3A,3B for simultaneous charging, the DC/DC converter 40 is structured to act as a second power stage providing the low constant voltage (e.g., 5V) to the USB Type C port 24 via the MOSFET 58 for charging the second device 3A.

The two power stages with the dynamic power sharing logic in accordance with the present disclosure are novel in that they eliminate the requirement to pull down the power rating or voltage rating during power sharing so as to supply the same power at the same constant voltage as is required by the conventional USB ports in USB Wall receptacles. For example, for a conventional USB Wall receptacle having a total power capacity at 60 W, in order to simultaneously charge a cellular phone with a voltage and current rating of 5V@3 A and a laptop with voltage and current ratings of 5V@3 A, 9V@3 A, 15V@3 A and 20V@3 A, both the USB ports supply maximum common power capacity and voltage rating at 15 W and 5V. Thus, a USB Type C PD port in a conventional USB Wall receptacle, which is capable of supplying the maximum power at 60 W with the voltage rating at 20V in this example, is required to not only bring down its voltage rating from 20V to 5V in order to provide the same constant 5V rating during power sharing, but also forego power capacity of up to 30 W by having to supply power at the reduced 5V rating. Such arbitrary reduction of voltage and power capacity is inefficient and wasteful. By having the two power stages, the dynamic power sharing dual USB Type C receptacle 1 eliminates such waste and inefficiencies and maximize the utilization of power capacity. For example, for the dynamic power sharing dual USB Type C receptacle 1 having the same total power capacity at 60 W, when both the USB ports 22,24 are coupled to the first and second devices 3A,3B for charging, the two power stages allow the USB Type C PD port 22 to supply to the first device a high power up to 45 W (i.e., total power capacity (60 W)—USB Type C port advertised power capacity (15 W)) at 5V, rather than 15 W at 5V. In short, the two power stages with the dynamic power sharing logic enable true power sharing between the USB ports 22,24, utilizing the full power capacity of the receptacle 1 without compromising power density and charging time.

The dual Type C & PD controller 50 is coupled to the AC/DC converter 30, the DC/DC converter 40, linear regulator 60, and the USB ports 22,24. The dual Type C & PD controller 50 includes MOSFETs 56,58, a processor and memory (not shown). The processor may be, for example and without limitation, a microprocessor, a microcontroller, or some other suitable processing device or circuitry. The memory can be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The memory may include the dynamic power sharing logic. The dynamic power sharing logic is a firmware, a software, codes, instructions, etc., for performing dynamic power sharing between the USB ports 22,24.

The dual Type C & PD controller 50 is structured to: determine whether one or more USB ports 22,24 are coupled to the respective devices for charging; and manage a first power negotiation and dynamic power sharing between the USB Type C PD port and the USB Type C port based on a determination that both the USB Type C PD port and the USB Type C port are coupled to the respective devices 3A,3B for charging, or manage a second power negotiation between one of the USB ports 22,24 and the respective device 3A,3B for charging based on a determination that only one USB port 22,24 is coupled to the respective device 3A,3B. The first power negotiation comprises negotiating power output of the USB Type C PD port 22 with the first device based at least in part on the first power profile and a power profile of the first device and negotiating power output and current of the USB Type C port 24. The USB Type C port 24 may provide maximum power of 15 W (e.g., 5V@3 A) as per the device connected but the voltage remains the same (e.g., 5V). As such, the maximum power capacity and the variable current rating of the USB Type C port 24 may be advertised during the first power negotiation. Managing the second power negotiation includes negotiating power output of the USB Type C PD port 22 with the first device based on a determination that only the USB Type C PD port 22 is coupled to the first device for charging, or negotiating power output of the USB Type C port 24 with the second device based on a determination that only the USB Type C port 24 is coupled to the second device for charging. The USB Type C PD port 22 advertises the power profile of the USB Type C PD port 22 during the negotiation. The USB Type C port 24 advertises the power profile of the USB Type C port 24 during the negotiation.

The dual Type C & PD controller 50 manages the dynamic power sharing between the USB ports 22,24 when both USB ports 22,24 are coupled to respective devices 3A,3B for charging. The dynamic power sharing includes activating the dynamic power sharing logic; advertising a first power profile of the USB Type C PD port 22 and a second power profile of the USB Type C port 24, the first power profile including the first power rating and a first voltage and current rating and the second power profile including the second power rating and a second voltage and current rating; and simultaneously charging the respective devices by the USB Type C PD port 22 using the first power rating and by the USB Type C port 24 using the second power rating. The simultaneously charging the respective devices 3A,3B includes receiving, by the USB Type C PD port 24, high power from the AC/DC converter 30 via the MOSFET 56 coupled to the AC/DC converter 30 and the USB Type C PD port 22, and supplying the high power to the first device by the USB Type C PD port 22; and receiving, by the USB Type C port 24, low power from the DC/DC converter 40 via the MOSFET 58 coupled to the DC/DC converter 40 and the USB Type C port 24, and supplying the low power to the second device by the USB Type C port 24. The first power rating is equal to a difference between a total power capacity of the receptacle 1 and the second power rating. The second power rating may be 15 W. The first voltage and current rating includes voltage ratings including at least one of 5V, 9V, 12V, 15V, or 20V. The second voltage and current rating includes a voltage rating of constant 5V. As such, the dynamic power sharing in accordance with the present disclosure allows the USB ports 22,24 to supply charging power to the attached devices 3A,3B at different power capacities and voltage ratings, thereby maximizing the utilization of power capacity, optimizing the power density, and increasing the efficiency.

Figure 5:
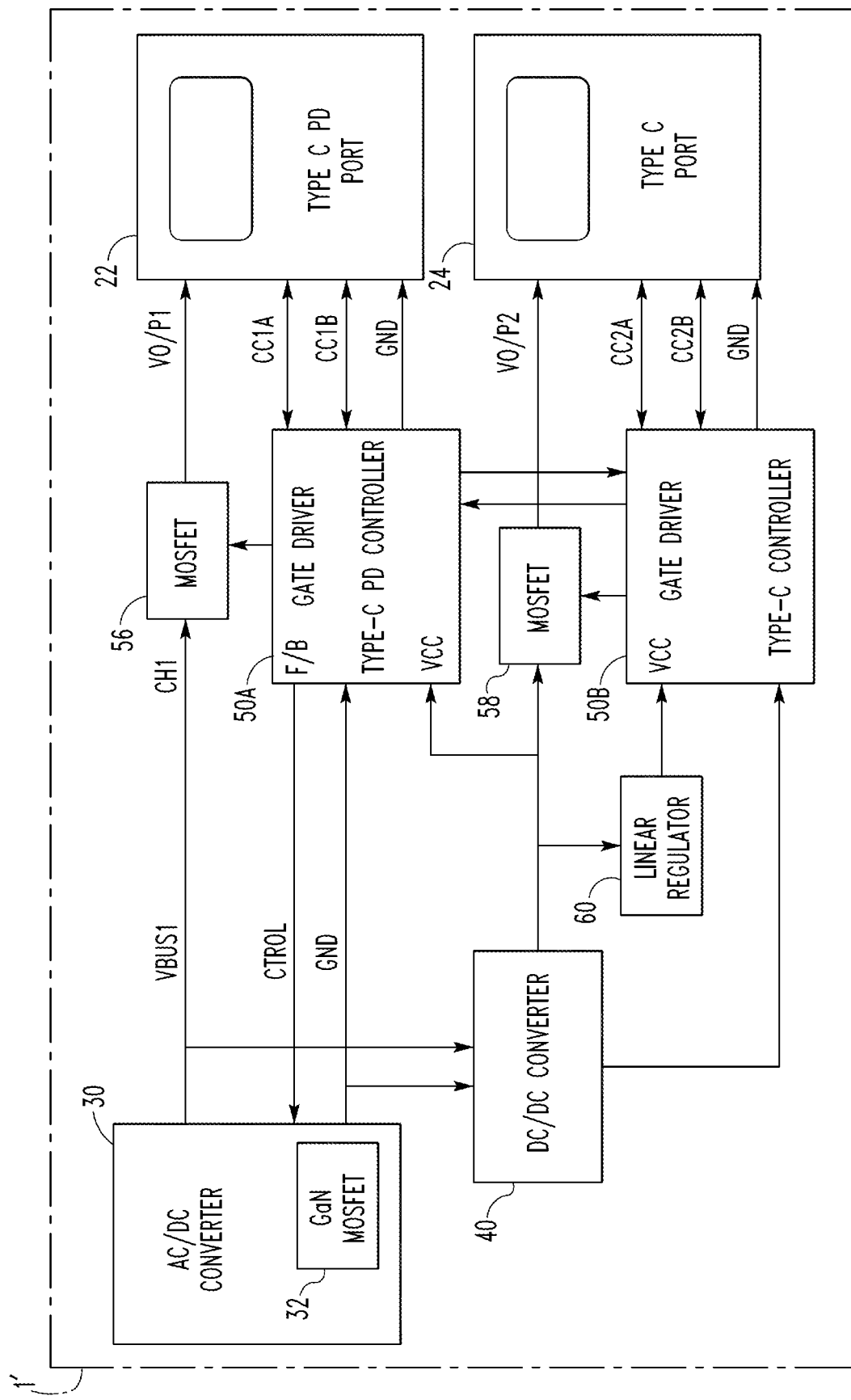
FIG. 5 is a schematic diagram of circuitry of a receptacle in accordance with an example embodiment of the disclosed concept.

FIG. 5 is a schematic diagram of circuitry of the dynamic power sharing dual USB Type C receptacle 1' in accordance with an example embodiment of the disclosed concept. The circuitry of the dynamic power sharing dual USB Type C receptacle 1' is the same with the circuity of the dynamic power sharing dual USB Type C receptacle 1 of FIG. 5, except in that it includes external MOSFETS 56,58, a Type C PD controller 50A for controlling the USB Type C PD port 22 and a Type C controller for controlling the USB Type C port 24. As such, any overlapping descriptions of any features in FIG. 5 are omitted for brevity. The controllers 50A,50B are structured to manage power negotiation and dynamic power sharing between the USB ports. The MOSFETS 56,58 are external to the controllers 50A,50B so as to allow using bigger MOSFETs for faster charging. The MOSFETs 56,58 may be any MOSFET (e.g., silicon MOSFET, GaN MOSFETs, etc.). The MOSFETs 56,58 are structured to turn on the USB ports 22,24 for charging the first and second devices. Assuming the dynamic power sharing dual USB Type C receptacle 1' has a total power capacity of 60 W, if only the USB Type C PD port 22 is active and connected to a first device, the USB Type C PD port 22 advertises a power profile including the full power rating at 60 W and variable voltage and current ratings including 5V@3 A, 9V@3 A, 15V@3 A and 20V@3 A. Upon acceptance by the first device of advertised charging capacities of the USB Type C PD port 22 and reception of a PS_ready message, the Type C PD controller 50A causes the MOSFET 56 to turn on the USB Type C PD port 22, which in turn supplies the power at the accepted voltage and current rating by the first device. In another example, if only the USB Type C port 24 is active and connected to the second device, the USB Type C port 24 advertises its power profile including a power rating at, e.g., without limitation, 15 W maximum power with variable current at constant 5V rating (e.g., a 5V@3 A). Upon acceptance of the advertised power profile by the second device and reception of a PS_ready message, the Type C controller 50B causes the MOSFET 58 to switch to turn on the USB Type C port 24, which in turn supplies the power at 15 W with 5V@3 A to the second device for charging. In yet another example, if both the USB Type C PD port 22 and the USB Type C port 24 are active and connected to respective first and second devices for simultaneous charging, under the dynamic power sharing logic the USB Type C port 24 advertises the maximum 15 W power capacity with variable current with constant 5V (e.g., 5V@3 A) rating and the USB Type C port 22 advertises the remaining power 45 W with its variable voltage and current ratings including 5V@3 A, 9V@3 A, 15V@3 A and 20V@3 A. Upon acceptance of the advertised power capacity and voltage and current rating by the first and second devices and reception of a PS_ready message, the Type C PD controller 50A and Type C controller 50B cause respective MOSFETs 56,58 to turn on respective USB ports 22,24.

Figure 6:
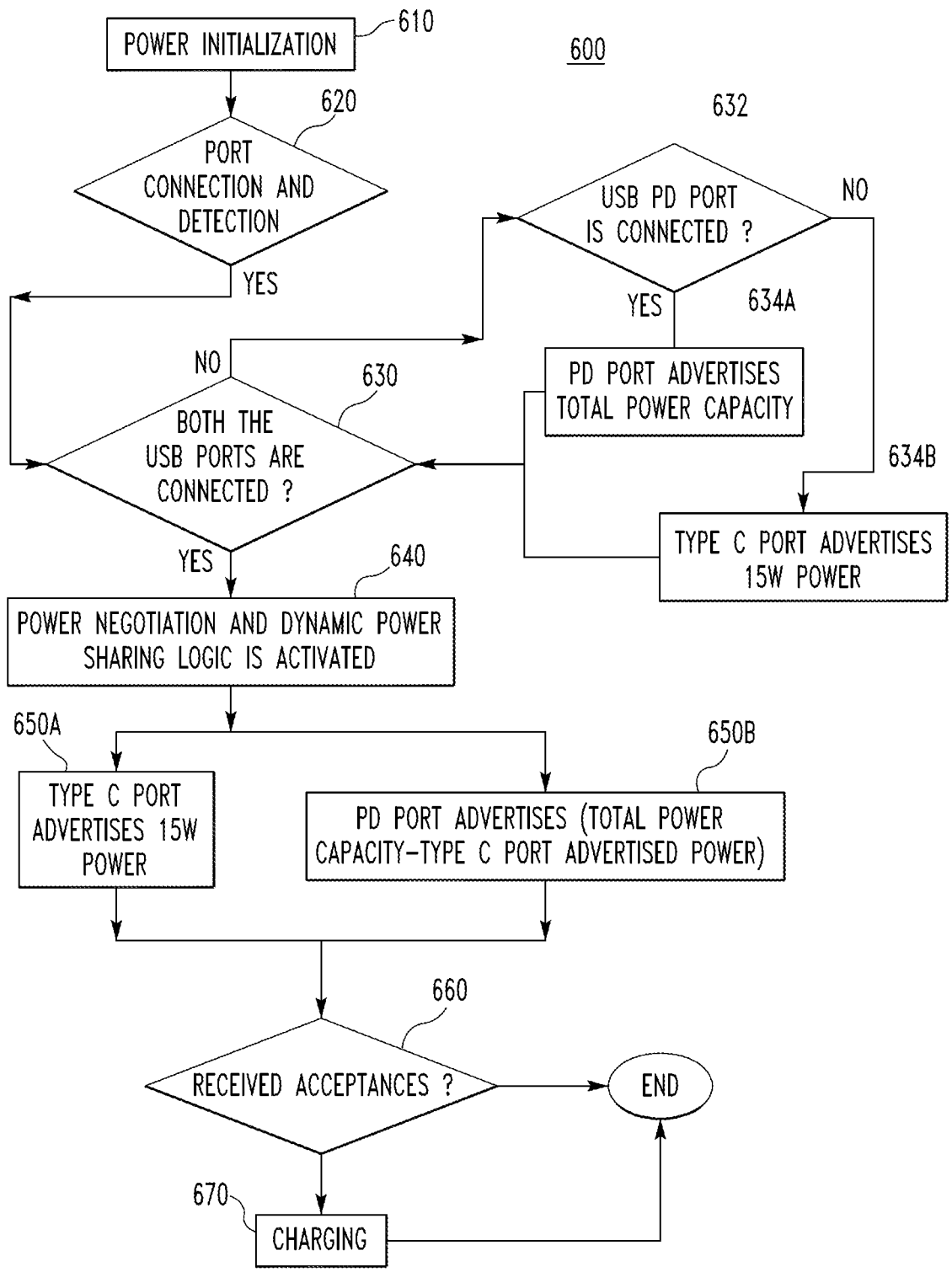
FIG. 6 is a flow chart for an example method for dynamic power sharing accordance with an example embodiment of the disclosed concept.

FIG. 6 is a flow chart for an example method 600 for dynamic power sharing in accordance with an example embodiment of the disclosed concept. The method 600 may be performed by a dynamic power sharing dual USB Type C & PD receptacle 1,1' as described with reference to FIGS. 1, 2, 4 and 5 and/or any components thereof in accordance with an example embodiment of the disclosed concept.

At 610, power initialization of the dynamic power sharing dual USB Type C & PD receptacle occurs. The dynamic power sharing dual USB Type C & PD receptacle includes a USB Type C PD port for powering a device requiring high power (e.g., without limitation, more than 15 W charging power) and a USB Type C port for charging a device requiring low power up to 15 W. The USB Type C PD port and the USB Type C port are collectively referred to as USB ports.

At 620, the dynamic power sharing dual USB Type C & PD receptacle (specifically, a dual Type C PD controller, Type C PD controller, or Type C controller, hereinafter individually and/or collectively referred to as the "controller") determines whether one or more USB ports are connected to a device(s) for charging via a USB Type C cable(s) and detects the device(s) connected. If one or more USB ports are connected and the device(s) connected are detected, the method 600 proceeds to 630. If not, the method 600 ends.

At 630, the controller determines whether both the USB Type C PD port and the USB Type C port are connected to respective devices for charging. If yes, the method 600 proceeds to 640. If no, the method 600 proceeds to 632, and at 632 the controller determines whether the USB Type C PD port is connected to a device for charging. If yes, the method 600 proceeds to 634A at which the USB Type C PD port advertises its power profile including total power capacity of the receptacle and voltage and current rating of the USB Type C PD port. If no, the method 600 proceeds to 634B at which the USB Type C port advertises its power profile including a power rating at 15 W with voltage and current rating of 5V@3 A. If respective device accepts the advertised power capacity and voltage and current rating, the USB Type C PD port or the USB Type C port charges respective device. During and/or subsequent to this charging, the method 600 returns to 630 at which the controller checks whether both the USB ports are connected for charging.

At 640, the USB ports perform power negotiation and activate a dynamic power sharing logic. The dynamic power sharing logic is a firmware, a software, codes, or instructions, etc., enabling the USB ports to simultaneously charge the respective devices and share power among the USB ports. The dynamic power sharing logic allows the USB Type C PD port retain variable voltage ratings (e.g., 5V, 9V, 15V or 20V) while the USB Type C port's voltage rating remains at constant at 5V during charging. The method 600 proceeds to 650A and 650B under the dynamic power sharing logic.

At 650A, the USB Type C port advertises maximum power capacity (i.e., 15 W) and variable current (e.g., 3 A, 5 A, etc.). At 650B, the USB Type C PD port advertises its power profile including its variable voltage and current rating (e.g., 5V@3 A, 9V@3 A, 15V@3 A and 20V@3 A) and power capacity which is equivalent to the difference between the total power capacity of the dynamic power sharing dual USB Type C dynamic power sharing dual USB Type C receptacle and the Type C port advertised power. That is, 45 W if the total power capacity is 60 W.

At 660, the controller determines whether it has received acceptances for the advertised power capacities and voltage and current ratings from respective devices. If yes, the method 600 proceeds to 670. If no, the method 600 ends.

At 670, the USB ports charge the respective devices attached for charging. Upon completion of charging the respective devices, the method 600 ends.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A receptacle comprising:
   a plurality of universal serial bus (USB) ports comprising a USB Type C power delivery (PD) port and USB Type C port, the USB ports couplable to respective devices for charging;
   a controller coupled to the USB Type C PD port and the USB Type C port, the controller comprising a dynamic power sharing logic and structured to:
   (i) determine whether one or more USB ports are coupled to the respective devices, and
   (ii) manage power negotiation between the USB ports and the respective devices based on the determination that one or more USB ports are coupled to the respective devices;
   an alternating current to direct current (AC/DC) converter coupled to the controller and structured to provide high power directly to the USB Type C PD port; and
   a DC/DC converter coupled to the controller and the AC/DC converter and structured to receive DC from the AC/DC converter, reduce the received DC, and provide low power directly to the USB Type C port,
   wherein the respective devices comprise a first respective device couplable to the USB Type C PD port and a second respective device couplable to the USB Type C port, and the controller comprises a first controller coupled to the USB Type C PD port and a second controller coupled to the USB Type C port,
   wherein in response to a determination that both the USB Type C PD port and the USB Type C port are coupled to the respective devices, the first controller and the second controller are structured to activate the dynamic power sharing logic, and
   wherein the USB Type C PD port advertises a first power profile that comprises a first power rating and a first voltage and current rating of the USB Type C PD port, and the USB Type C port advertises a second power profile that comprises a second power rating and a second voltage and current rating of the USB Type C port, the first power rating being a difference between a total power capacity of the receptacle and the second power rating.

2. The receptacle of claim 1, further comprising:
   a single or duplex socket coupled to a power source and structured to receive a plug and provide utility power through the plug to a connected device.

3. The receptacle of claim 1, further comprising:
   a first switch that is coupled directly to the AC/DC converter, the first controller, and the USB Type C PD port, the first switch being structured to turn on the USB Type C PD port for charging the first device, and
   a second switch that is coupled to directly to the DC/DC converter, the second controller, and the USB type C port, the second switch being structured to turn on the USB Type C port for charging the second device.

4. The receptacle of claim 3, wherein the first and second switches each comprise a MOSFET.

5. The receptacle of claim 1, wherein, upon receiving an acceptance of the advertised first power profile and second power profile from the respective devices, the receptacle simultaneously charges the first respective device via the USB Type C PD port using the first power rating and the second respective device via the USB Type C port using the second power rating.

6. The receptacle of claim 1, wherein the first voltage and current rating comprises voltage ratings including at least one of 5V, 9V, 12V, 15V, or 20V.

7. The receptacle of claim 1, wherein the second voltage and current rating comprises a voltage rating of constant 5V.

8. The receptacle of claim 1, further comprising:
   a display structured to display real-time power information including a power profile that includes a voltage and current rating and a power rating for at least one of the USB ports.

9. The receptacle of claim 1, wherein the USB ports comprise smart USB ports structured to allow the respective devices to specify amount of required power for charging during the power negotiation and disconnect current upon fully charging the respective devices.

10. A method of dynamic power sharing using a dual universal serial bus (USB) Type C and PD receptacle, comprising:
    initializing power for the dual USB Type C and PD receptacle that comprises a plurality of USB ports including a USB Type C power delivery (PD) port and a USB Type C port, the USB ports being couplable to respective devices for charging;
    determining, by a controller of the receptacle, whether one or more USB ports are coupled to the respective devices for charging;
    managing, by the controller, power negotiation and dynamic power sharing between the USB Type C PD port and the USB Type C port based on the determination; and
    supplying power to at least one of the USB ports based on the determination, the power comprising high power supplied directly from an alternating current (AC) to direct current (DC) converter to a first respective device coupled to the USB Type C PD port and low power supplied directly from a DC/DC converter to a second respective device coupled to the USB Type C port, the DC/DC converter structured to receive the high power from the AC/DC converter and reduce to the low power,
    wherein the controller comprises a first controller that is coupled to the USB Type C PD port and a first switch external to the first controller and a second controller that is coupled to the USB Type C port and a second switch external to the second controller;
    wherein in response to a determination that both the USB Type C PD port and the USB Type C port are coupled to the respective devices, the managing power negotiation and dynamic power sharing comprises:
    activating a dynamic power sharing logic;
    turning on the USB Type C PD port by the first switch and the USB Type C port by the second switch; and
    advertising, by the USB Type C PD port, a first power profile and advertising, by the USB Type C port, a second power profile, the first power profile comprising a first power rating and a first voltage and current rating of the USB Type C PD port and the second power profile comprising a second power rating and a second voltage and current rating of the USB type C port, the first power rating being a difference between a total power capacity of the receptacle and the second power rating.

11. The method of claim 10, wherein the supplying power to at least one of the USB ports comprises:

simultaneously charging the first respective device by the USB Type C PD port using the first power rating and the second respective device by the USB Type C port using the second power rating.

12. The method of claim 10, further comprising:

displaying, by a display included in the receptacle, real-time power information including a voltage and current rating and a power rating for at least one of the USB ports.

\* \* \* \* \*